(12) United States Patent
Wakabayashi et al.

(10) Patent No.: US 7,006,309 B2
(45) Date of Patent: Feb. 28, 2006

(54) PRISM UNIT AND LASER DEVICE

(75) Inventors: Osamu Wakabayashi, Hiratsuka (JP);
Georg Soumagne, Oiso-machi (JP);
Takahito Kumazaki, Hiratsuka (JP)

(73) Assignee: Gigaphoton, Inc., Tokyo (JP)

( * ) Notice: Subject to any disclaimer, the term of this patent is extended or adjusted under 35 U.S.C. 154(b) by 36 days.

(21) Appl. No.: 10/280,031

(22) Filed: Oct. 25, 2002

(65) Prior Publication Data

US 2003/0103280 A1    Jun. 5, 2003

(30) Foreign Application Priority Data

Nov. 2, 2001    (JP)    ............................. 2001-337336

(51) Int. Cl.
*G02B 5/04*    (2006.01)
(52) U.S. Cl. ...................... 359/837; 359/640; 372/100
(58) Field of Classification Search ............... 359/615, 359/638, 639, 640, 831, 837; 372/20, 100; 356/326, 332
See application file for complete search history.

(56) References Cited

U.S. PATENT DOCUMENTS

| | | | | |
|---|---|---|---|---|
| 3,775,699 A | * | 11/1973 | Cassels ......................... | 372/19 |
| 3,807,837 A | * | 4/1974 | Schmidt et al. ............. | 359/837 |
| 3,900,263 A | * | 8/1975 | Hall, Jr. ....................... | 356/300 |
| 5,002,364 A | * | 3/1991 | Steenblik ..................... | 359/15 |
| 5,155,633 A | * | 10/1992 | Grove et al. ................. | 359/834 |
| 5,235,605 A | * | 8/1993 | Rines et al. .................. | 372/20 |
| 5,317,450 A | * | 5/1994 | Kamon ......................... | 359/566 |
| 5,406,571 A | * | 4/1995 | Bucher et al. ................ | 372/20 |
| 6,038,076 A | * | 3/2000 | Bouzid et al. ............... | 359/640 |
| 6,192,064 B1 | * | 2/2001 | Algots et al. ................. | 372/99 |
| 6,594,301 B1 | * | 7/2003 | Pang .......................... | 372/100 |

FOREIGN PATENT DOCUMENTS

| | | |
|---|---|---|
| JP | 03-120772 | 5/1991 |
| JP | 09-152504 | 6/1997 |
| JP | 11-177173 | 7/1999 |
| JP | 2000-311375 | 11/2000 |

OTHER PUBLICATIONS

T. McKee; "Spectral-narrowing techniques for excimer laser oscillators", Canadian Journal of Physics, vol. 63, pp. 214-219 (1985).

* cited by examiner

*Primary Examiner*—Mark A. Robinson
(74) *Attorney, Agent, or Firm*—Westerman, Hattori, Daniels & Adrian, LLP

(57) ABSTRACT

A prism unit, which is capable of firmly fixing a plurality of prism parts in a small space, and a laser device, which is capable of enhancing output power of laser light with use of the prism unit, are provided. For this purpose, a prism unit (28) includes a plurality of prism parts (35), which refract incident light (21), and a fixed part (36) which is fixed to or formed integrally with at least two of the plurality of prism parts. Further, a laser device includes the prism unit (28), and only a wavelength in a desired range out of a plurality of oscillation wavelengths is selectively oscillated by the prism unit.

4 Claims, 9 Drawing Sheets

US 7,006,309 B2

PRISM UNIT AND LASER DEVICE

TECHNICAL FIELD

The present invention relates to a laser device in which a wavelength is band-narrowed or line-selected, and a prism used therefor.

BACKGROUND ART

Conventionally, means for performing wavelength selection (line selection) for laser light with use of a dispersing prism, and narrowing spectral line width thereof is known, and, for example, document, Canadian Journal of Physics Vol.63.1985 (pp.214–219) shows the one. FIG. 10 shows a plan view of a molecular fluorine laser device in which spectral line width is narrowed with use of line select means disclosed in the aforementioned document, and the prior art will be explained hereinafter based on FIG. 10.

In FIG. 10, a molecular fluorine laser device 11 includes a laser chamber 12 in which a laser gas that is a laser medium is sealed. The laser gas contains fluorine (F2) and a buffer gas with predetermined composition. As the buffer gas, helium (He), neon (Ne), or a mixture gas of both of them is generally used. A pair of discharge electrodes 14 and 15 are placed to oppose each other perpendicularly to the paper surface of FIG. 10 inside the laser chamber 12. The discharge electrodes 14 and 15 are connected to a high voltage power supply (not shown), and high voltage is applied to the discharge electrodes 14 and 15. Consequently, a pulse discharge occurs between the discharge electrodes 14 and 15, which excites the laser gas to oscillate molecular fluorine laser light 21 (hereinafter, called the laser light 21) in a pulse form.

A front window 17 and a rear window 19, which transmit the laser light 21, are provided at a front and rear parts of the laser chamber 12. A front slit 26 and a rear slit 27, which have openings of predetermined width, are placed in front (the right side in FIG. 10) of and behind the laser chamber 12. A front mirror 16, which partially transmits the laser light 21, is placed in front of the front slit 26. For example, two dispersing prisms 50 and 50 are placed behind the rear slit 27, and a rear mirror 18, which totally reflects the laser light 21, is placed behind the dispersing prisms 50 and 50.

In FIG. 10, 44 denotes a fixing plate for fixing the dispersing prisms 50 and 50. Rods 45 with tip ends being threaded are protruded from a base (not shown) around the dispersing prisms 50 and 50. Each of the dispersing prisms 50 is pressed from above by the fixing plate 44 and nuts 46 to be fixed. Namely, if an adhesive or the like is used to fix the dispersing prism 50 in the laser device which emits the laser light 21 with an ultraviolet ray wavelength, such as the molecular fluorine laser device 11, and an excimer laser device, the adhesive reacts with the laser light 21 and impurities occur. In order to prevent optical components such as the dispersing prism 50 from being contaminated by the impurities, it is necessary to fix the dispersing prism 50 by using only a force by pressing or the like in these laser devices.

The laser light 21 oscillated in the laser chamber 12 passes through the windows 17 and 19, and the dispersing prisms 50 and 50, and is amplified while it is reflected and reciprocated between the rear mirror 18 and the front mirror 16, and part of it is transmitted through the front mirror 16 and taken out. At this time, strong line light (center wavelength 157.63 nm) with a long wavelength, and weak line light (center wavelength 157.52 nm) with a short wavelength are mixed in the laser light 21. Since strong line light and weak line light differ in wavelength, a difference occurs to a refraction angle of an optical path transmitted through the dispersing prisms 50 and 50. Consequently, the optical paths of the strong line light and weak line light are gradually deviated while they pass through two of the dispersing prisms 50 and 50.

As a result, the strong line light passing through the dispersing prisms 50 and 50 passes through openings of the slits 26 and 27 to be emitted from the front mirror 16. On the other hand, the weak line light has its optical path deviated while passing through two of the dispersing prisms 50 and 50 and is shielded by the front slit 26 and the rear slit 27, and is not oscillated. In the molecular fluorine laser device 11, only the strong line light is oscillated in this manner, whereby the spectral line width of the laser light 21 is narrowed, and resolution when the molecular fluorine laser device 11 is used for exposure is improved.

However, the above-described prior art has the problems as described as follows. Namely, in the prior art, as shown in FIG. 10, the individual dispersing prisms 50 and 50 are held by the fixing plates 44 and 44. Consequently, a large space is required around the dispersing prisms 50 and 50, and a space between the dispersing prisms 50 and 50 is made larger, thus making the distance the laser light 21, which is emitted from the laser chamber 12 rearward, travels until it reaches the rear mirror 18 becomes long. The laser light 21 emitted from the laser chamber 12 does not receive energy by pulse discharge, and therefore it is never amplified. In addition, resonator length that is the distance between the front mirror 16 and the rear mirror 18 becomes longer, and therefore there arises the problem that output power of the laser light 21 is reduced by the diffraction loss.

Further, when the laser light 21 emitted from the molecular fluorine laser device 11 is used for exposure, the laser light 21 has to be oscillated at high repeated frequency for a long period of time. For this purpose, it is necessary to reduce a width dimension L1 in a vertical direction in FIG. 10 of the discharge electrodes 14 and 15 of the molecular fluorine laser device 11, and increase a space between the opposing discharge electrodes 14 and 15 (in the perpendicular direction to the paper surface of FIG. 10). As a result, a beam sectional form of the laser light 21 is oblong, with a width dimension L2 in a horizontal direction with respect to the paper surface in FIG. 10 being 3 mm, and a height dimension (not shown) in the perpendicular direction to the paper surface in FIG. 10 being 20 mm. Namely, the dispersing prisms 50 and 50 on which the laser light 21 is incident also need to have the height in the perpendicular direction to the paper surface in FIG. 10 made 20 mm or higher. Accordingly, in order to hold the dispersing prisms 50 and 50 with stability, it is necessary to use the dispersing prisms 50 and 50 with large bottom areas and make the installation areas in contact with a base (not shown) large. As a result, the resonator length becomes longer, and the output power of the laser light 21 is reduced.

On the other hand, if the dispersing prisms 50 and 50 with the small bottom areas are used to prevent reduction of the output power of the laser light 21, stability of the dispersing prisms 50 and 50 is decreased, and the incidence planes are sometimes inclined with respect to an optical axis of the laser light 21. As a result, a wavefront is disturbed to cause wave aberration, and line select is not favorably performed, or reduction in output power of the laser light 21 is sometimes caused.

According to FIG. 10, the entire dispersing prisms 50 and 50 are pressed by the fixing plates 44 and 44. Consequently, the force is also exerted on the parts through which the laser light 21 is transmitted, and therefore a distortion sometimes occur to insides of the dispersion prisms 50 and 50. As a result, birefringence is caused to change the optical path of the laser light 21, or disturb the wavefront, whereby line selection is not sometimes performed favorably. In addition, the output power of the laser light 21 is sometimes reduced. If the dispersing prisms 50 and 50 are pressed with a small force to prevent this, it sometimes happens that the dispersing prisms 50 and 50 are deviated from the optical axis by vibrations and the like, thus reducing the output power of the laser light 21 or causing variations in the output power.

SUMMARY OF THE INVENTION

The present invention is made in view of the above-described problems, and has its object to provide a prism unit capable of firmly fixing a plurality of prism parts in a small space, and a laser device capable of increasing output power of laser light by reducing resonator length with use of this prism unit.

In order to attain the above-described object, a first aspect of the prism unit according to the present invention includes a plurality of prism parts which refract incident light, and a fixed part which is fixed to or formed integrally with at least two of the plurality of prism parts. According to the constitution, the fixed part, which does not transmit the incident light, is pressed and the prism part can be fixed. Accordingly, it does not happen that the prism part is distorted as a result that force is exerted on the prism part through which light passes when it is fixed, and the light passing through the prism part is not influenced by birefringence and the like due to distortion.

A second aspect of the prism unit according to the present invention includes a plurality of prism parts which refract incident light, and a plurality of fixed parts which are fixed to or formed integrally with the respective plurality of prism parts. Consequently, since the prism part and the fixed part are integrated, positioning of the prism parts is performed when the prism parts are produced, and therefore very accurate positioning is possible.

In the prism unit, a plurality of prism parts may be positioned into each predetermined position by bringing the fixed parts into contact with each other directly or via jigs. Consequently, the prism unit is made compact, and positioning of the prism parts is simplified. When positioning with respect to the optical axis is performed, the entire prism part can be moved and positioned, and therefore the positioning mechanism is simplified.

In the prism unit, the fixed parts may be fixed to each other by optical contact. By fixing the fixed parts to each other in this manner, the positional relationship which is positioned is not displaced, and time and trouble for positioning can,be saved. Since a material which generates impurities, such as an adhesive is not used in optical contact, impurities are not caused by fixing, and therefore the prism unit and the other optical components are not contaminated by the impurities.

In the prism unit, the prism part may be formed so that the incident light passes substantially perpendicularly to the cleavage surface of the prism part when the incident light passes through the prism part. According to the constitution, when light passes through the prism part, the influence of birefringence can be reduced to the minimum when the light passes through the prism part. Namely, out of the light which is incident on the prism part at substantially the Brewster angle, polarized light P is transmitted through the prism part with substantially no loss, but the reflectivity at which the polarized light S is reflected at the prism part is large, and this becomes the cause of the output power loss of the laser light. Accordingly, the problem that part of the light having the polarized light P becomes the polarized light S, and the transmissivity of the light which is transmitted through the prism part is reduced, can be decreased. Especially the light with the wavelength desired to be selected out of the incident light, passes substantially perpendicularly to the cleavage surface, whereby wavelength selection can be performed at high purity, and mixture of the light with the other wavelength is decreased.

In the prism unit, at least one of the plurality of prism parts may be a dispersing prism part which refracts the incident light at an angle corresponding to a wavelength of the incident light. The dispersing prism has a large bottom area as compared with, for example, a beam expander and the like since it is general to make the vertex angle the Brewster angle. Accordingly, the merit of reduction in size by fixing the prism part at one spot as in the present invention is large.

The laser device according to the present invention includes the above-described prism unit, and only a wavelength in a desired range out of a plurality of oscillation wavelengths is selectively oscillated by the prism unit. According to the constitution, the prism unit is reduced in size, and therefore the resonator length of the laser device becomes small. Accordingly, the diffraction loss is reduced, and the output power of the laser light is increased.

BEST MODE FOR CARRYING OUT THE INVENTION

Preferred embodiments according to the present invention will be explained in detail below with reference to the drawings. In the following embodiments, the explanation is made with a molecular fluorine laser device in which line select of the wavelength is performed being taken as an example. In this specification, it is called line select to select desired one wavelength or a few wavelengths out of a plurality of wavelengths of light and output it or them. On the other hand, it is called band-narrowing to narrow the spectral line width of light with use of a band-narrowing component such as an etalon and a grating. A prism according to the present invention can be also used as a wavelength selecting component or a band-narrowing component of a narrow-band KrF excimer laser device or a narrow-band ArF excimer laser device.

Figure 1:
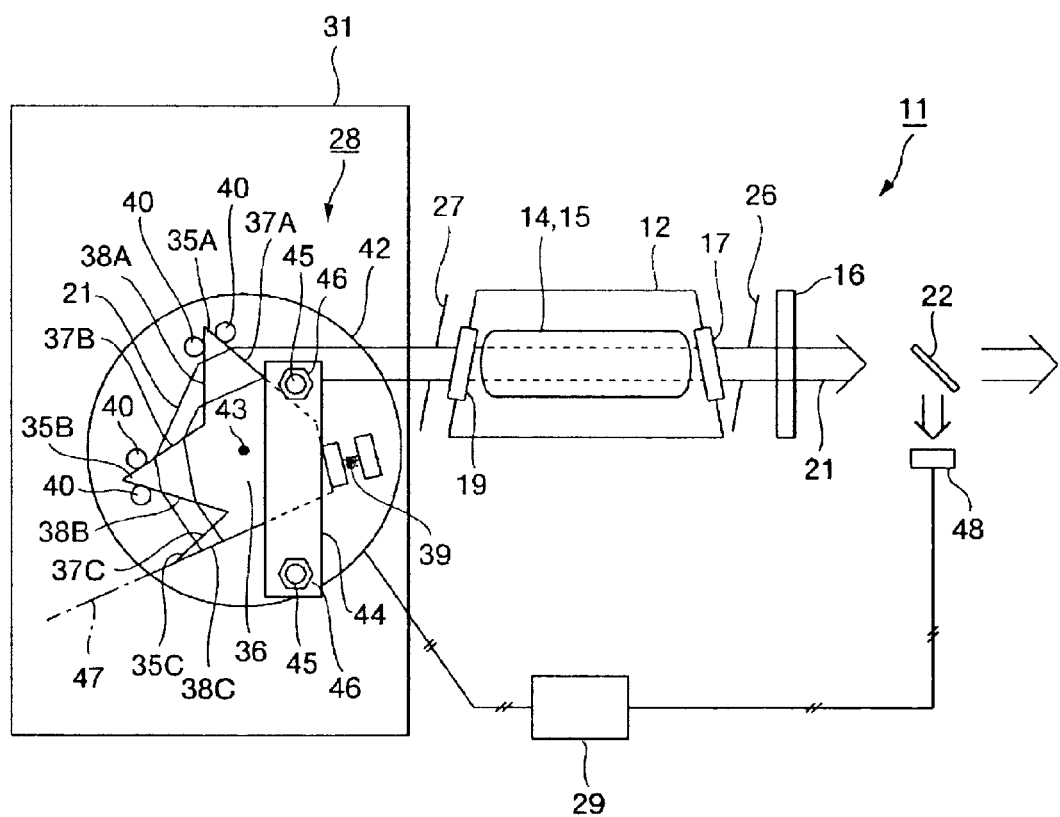
FIG. 1 is a block diagram of a molecular fluorine laser device using a dispersing prism unit according to a first embodiment of the present invention.

First, a first embodiment will be explained. FIG. 1 shows a block diagram of the molecular fluorine laser device with use of a dispersing prism unit according to the embodiment. In FIG. 1, a molecular fluorine laser device 11 includes a laser chamber 12 in which a laser gas containing fluorine (F2) is sealed. Windows 17 and 19 through which laser light (molecular fluorine laser light) 21 is transmitted are provided at a front and a rear parts of the laser chamber 12.

Slits 26 and 27 are placed in front of and behind the laser chamber 12. A front mirror 16 which partially transmits the laser light 21 is placed in front of the laser chamber 12. Each of the slits 26 and 27 is formed of metal such as aluminum for the purpose of shielding light. It is desirable that the slits 26 and 27 are each placed by being inclined at an angle of a fixed value or more from the perpendicular (for example, three degrees or more) with respect to an optical axis of the laser light 21 to prevent an undesired wavelength is amplified in a laser medium by scattering or reflection on their surfaces.

Inside the laser chamber 12, a pair of discharge electrodes 14 and 15 are placed to oppose each other in a perpendicular direction to the paper surface in FIG. 1. By applying high voltage in a pulse form between the discharge electrodes 14 and 15 from a high voltage power supply which is not shown, pulse discharge is caused between the discharge electrodes 14 and 15, and the laser gas is excited, whereby the laser light 21 occurs. The laser light 21, which occurs inside the laser chamber 12, is emitted rearward, and is incident on a line select box 31. In the case of the KrF excimer laser device and the ArF excimer laser device in which the wavelength is band-narrowed, instead of the molecular fluorine laser device 11 in which the wavelength is line-selected, the laser light 21 is incident on the band-narrowing box 31. The line select box 31 and the band-narrowing box 31 will be collectively called the box 31 hereinafter.

An inside the box 31 is always purged with a clean gas with low reactivity such as nitrogen and helium by a purging mechanism (not shown), or decompressed to substantially vacuum. A dispersing prism unit 28 according to this embodiment is placed in the box 31. As a material of the dispersing prism unit 28, calcium fluoride (CaF2), which transmits the laser light 21 with low loss, is preferable.

Figure 2:
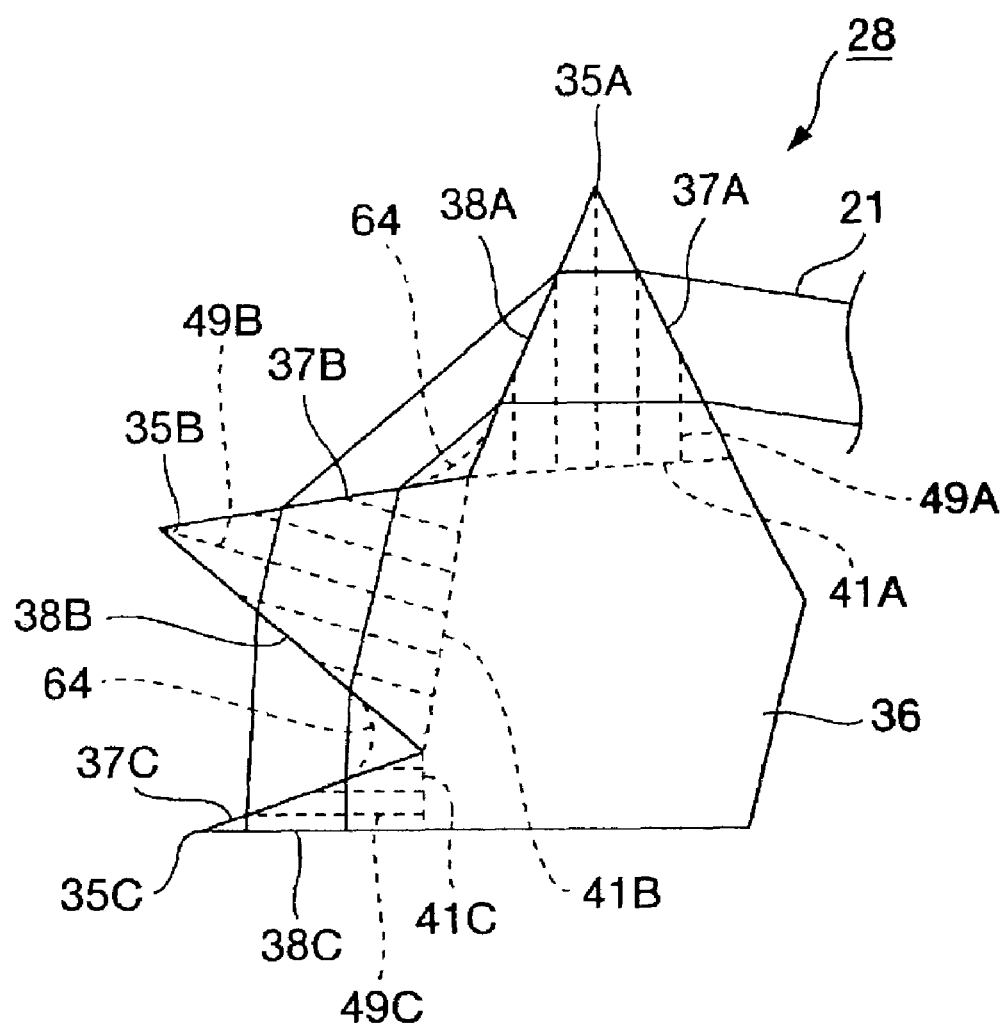
FIG. 2 is an enlarged view of the dispersing prism unit according to the first embodiment.

FIG. 2 shows an enlarged view of the dispersing prism unit 28. As shown in FIG. 1 and FIG. 2, the dispersing prism unit 28 includes a first to a third dispersing prism parts 35A to 35C through which the laser light 21 is transmitted. The dispersing prism unit 28 includes a fixed part 36 in which the first to the third dispersing prism parts 35A to 35C are integrated. The broken lines 41A to 41C show interfacial boundary surfaces between the dispersing prism parts 35A to 35C and the fixed part 36. In the following explanation, in the first to the third dispersing prism parts 35A to 35C of the dispersing prism unit 28, planes at a side of the laser chamber 12 are called a first to a third incidence planes 37A to 37C, and planes on the other side are called a first to a third exit planes 38A to 38C.

In this situation, the dispersing prism unit 28 may be integrally formed of a calcium fluoride crystal, and it may also be formed by producing the dispersing prism parts 35A to 35C, and the fixed part 36 separately and fixing them to each other at the interfacial boundary surfaces 41A to 41C. When both of them are fixed to each other at the interfacial boundary surfaces 41A to 41C, it is possible to produce the dispersing prism unit 28 so that the laser light 21 which passes through the dispersing prism parts 35A to 35C, and each of crystal cleavage surfaces 49A to 49C of the dispersing prism parts 35A to 35C is substantially perpendicular to each other Consequently, when the laser light 21 passes through the dispersing prism parts 35A to 35C, it is transmitted perpendicularly to the cleavage surfaces 49A to 49C of the crystal, and therefore it is hardly influenced by birefringence which a crystal of calcium fluoride originally has. Accordingly, it hardly happens that an optical path of the laser light 21 is branched by polarization, and thus it hardly happens that beam profile is disturbed, or the laser light 21 with an unintended wavelength is oscillated. In addition, wavelength selectivity when the laser light 21 passes through the dispersing prism parts 35A to 35C becomes the best.

The first and the second dispersing prism parts 35A and 35B each form a an isosceles triangle having such an apical angle as to make an incidence angle and an exit angle of the laser light 21 Brewster angles, as the dispersing prism 50 of the prior art. The prism in such a form is called a Brewster prism. For example, when the material of the dispersing prism unit 28 is calcium fluoride, a refractive index of calcium fluoride in the wavelength (about 157 nm) of the laser light 21 is about 1.559, from which the Brewster angle with respect to the laser light 21 is about 57.3 degrees. Accordingly, the apical angles of the first and the second dispersion prism parts 35A and 35B are each about 65.4 degrees.

In the above-described embodiment, the explanation is made with a Brewster prism taken as an example, but this is not restrictive, and the same effects can be obtained with prisms in the other forms. Further, antireflection coating (AR coating: Anti-Reflect Coating) may be applied to the incidence planes 37A to 37C and the exit planes 38A to 38C of the dispersing prism parts 35A to 35C.

The laser light 21 has its optical path bent by the first and the second dispersing prism parts 35A and 35B, and is incident on the third dispersing prism part 35C. The third dispersing prism part 35C is in a right triangle form that is divided into tow at the apical angle of each of the first and the second dispersing prism parts 35A and 35B, and the incidence angle of the laser light 21 with respect to the third incidence plane 37C is substantially a Brewster angle. Total reflection coating (not shown) for totally reflecting the laser light 21, which passes through the third dispersing prism part 35C, is applied to the third reflection plane 38C. The laser light 21 is reflected by this total reflection coating and goes back on the same path as it comes and is incident on the laser chamber 12 again.

As described above, the first to the third dispersing prism parts 35A to 35C serve the same purpose as the dispersing prisms 50 and 50 and the rear mirror 18 as in the prior art. Namely, as the result of the laser light 21 passing through these dispersing prism parts 35A to 35C, weak line light of the laser light 21 is deviated from the optical path of intense line light, and is shielded by the slits 26 and 27 to be prevented from being oscillated. As a result, line light is limited to only the line light with strong spectrum of the emission light, and thus the wavelength of the laser light 21 is band-narrowed.

In FIG. 1, part of the laser light 21 which returns to the laser chamber 12 is reflected at the front mirror 16, and the residual laser light 21 is transmitted through the front mirror 16 and is emitted forward (rightward in FIG. 1) from the molecular fluorine laser device 11. The emitted laser light 21 is incident on a beam splitter 22 and has a part of it sampled, and has its properties such as wavelength property, output power, or pointing stability measured. The residual laser light 21 is transmitted through the beam splitter 22 and is incident on a working machine such as an aligner not shown to be a light source for working.

Further, the dispersing prism unit 28 is mounted on a rotary stage 42 attached to the box 31 as shown in FIG. 1. The rotary stage 42 is rotatable around a rotation center 43 based on an instruction of a laser controller 29. Positioning pins 40 for positioning are protruded on the rotary stage 42, and the dispersing prism unit 28 is positioned by being pressed against the positioning pins 40 by a compression spring 39. Two rods 45 and 45 with its tip ends being threaded are protruded at both sides of the dispersing prism unit 28 on the rotary stage 42. The dispersing prism unit 28 is pressed against the rotary stage 42 from above to be fixed by the rods 45, a fixing plate 44 and nuts 46.

When laser oscillation is carried out, the box 31 is distorted by the influence of heat occurring from the laser chamber 12, and the positional relationship of the dispersing prism unit 28 with respect to the optical axis of the laser light 21 sometimes changes. Refractive indexes of the dispersing prism parts 35A to 35C, of which temperature rises by absorbing the laser light 21, varies, and the laser light 21 is sometimes distorted when it is transmitted through the insides of the dispersion prism parts 35A to 35C. As a result, for example, short line light is sometimes amplified, which causes unsatisfactory band narrowing, and the output power and pointing stability of the emitted laser light 21 sometimes vary. In order to prevent this, the laser controller 29 always monitors the center position and the output power of the emitted laser light 21 by a monitor 48, and controls them to be normal by rotating the rotary stage 42.

The rotary stage 42 includes a tilting mechanism (not shown) at a lower part thereof, and is rotatable around a tilt center axis 47 at which the reflection plane 38C of the third dispersing prism part 35C and a horizontal plane intersect. As a result, the reflection plane 38C with the total reflection coating being applied thereto is tilted with respect to the optical axis of the laser light 21, whereby the optical axis can be set properly.

In FIG. 1, the first to the third dispersing prism parts 35A to 35C are included, but they are not restrictive. For example, without including the first dispersing prism part 35A, the laser light 21 emitted from the laser chamber 12 may be directly incident on the second dispersing prism part 35B.

Figure 3:
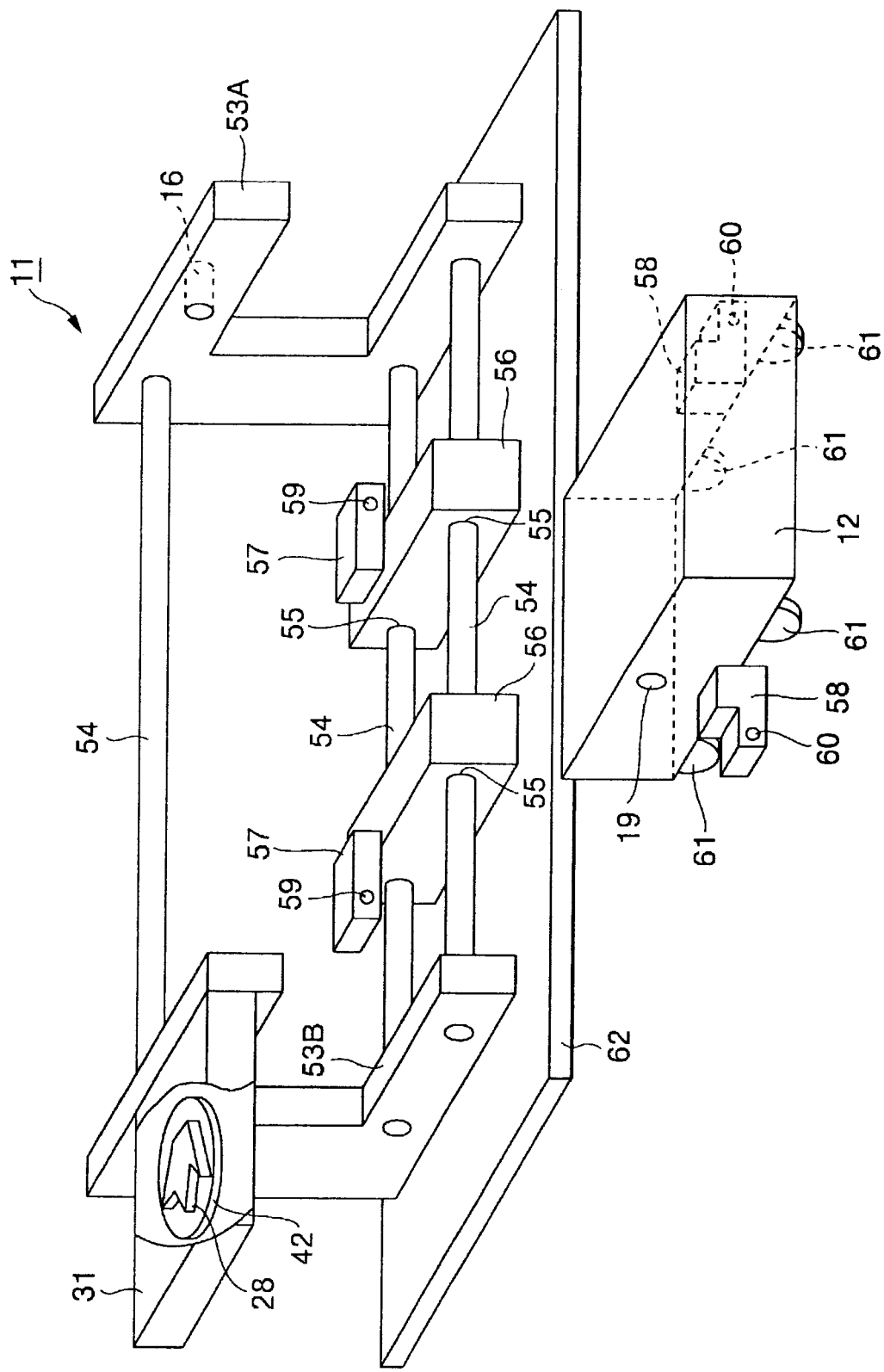
FIG. 3 is a perspective view of a molecular fluorine laser unit according to the first embodiment.

FIG. 3 shows a perspective view of a resonator of the molecular fluorine laser device 11 in the state in which the laser chamber 12 is removed. As shown in FIG. 3, two rails 56 and 56 are fixed on a base 62 of the molecular fluorine laser device 11 from the front to the back in FIG. 3. Cavity holes 55 and 55 are provided in the rail 56 at the front and the back of FIG. 3, and cavity rods 54 and 54 for supporting optical components penetrate through them. An inner diameter of the cavity hole 55 is a little larger than an outer diameter of the cavity rod 54, and the cavity rod 54 is slidable in a longitudinal direction thereof.

Front and rear cavity plates 53A and 53B are fixed at both end portions of the cavity rods 54 and 54 with screws or the like not shown. Another cavity rod 54 is placed and fixed at upper parts of the cavity plates 53A and 53B so that the cavity rod 54 and the other cavity rods 54 and 54 are located at the vertexes of a triangle within a plane perpendicular to the optical axis of the laser light 21. The laser chamber 12 includes wheels 61 on its bottom part and it is forced into an inner part by allowing the wheels 61 slide on the rails 56. Fixing holes 59 and 59 of brackets 57 and 57 fixed on the rails 56, and fixing holes 60 and 60 of brackets 58 and 58 fixed to the laser chamber 12 are fastened with bolts or the like not shown to be fixed.

The cavity rod 54 is made of a material with a very low coefficient of thermal expansion such as invar, and it is slidable with respect to the rail 56 as described above. Accordingly, even if thermal expansion occurs to the laser chamber 12 by pulse discharge, the cavity plates 53A and 53B do not move, and relative positional relationship between the cavity plates 53A and 53B can be maintained. A front mirror 16 is fixed at the cavity plate 53A in front of the laser chamber 12 (right side of FIG. 3). The box 31 in which the dispersing prism unit 28 is placed is fixed to the cavity plate 53B behind the laser chamber 12.

Alternatively, without providing the rotary stage 42 and the tilting mechanism (not shown) inside the box 31 as described above, the entire box 31 may be moved to adjust the optical axis. Namely, it is possible to connect the box 31 and the cavity plates 53A and 53B by means of bellows or the like, and drive the entire box 31 with a micrometer or the like to thereby perform positioning with respect to the optical axis.

In this embodiment, the dispersing prism 28 is integrated as described above, and therefore it is possible to perform positioning with respect to the optical axis by moving the entire dispersing prism unit 28, thus reducing intricacy in positioning.

As described above, according to the first embodiment, in the dispersing prism unit 28, a plurality of dispersing prism parts 35 which refract the laser light 21 at angles according to its wavelength are integrally formed at the fixed part 36. Consequently, the dispersing prism unit 28 can be fixed by pressing the fixed part 36 located outside the optical path of the laser light 21, and therefore the force to fix the dispersing prism unit 28 is not exerted on the dispersing prism part 35. Accordingly, birefringence due to distortion inside the dispersing prism parts 35A to 35C is never caused at the time of fixing, or wavefront of the laser light 21 passing through the dispersing prism parts 35A to 35C is never disturbed.

In this embodiment, the illustration shows that the border between the dispersing prisms parts 35 is a sharp valley, but the incidence plane 37 and the exit plane 38 may be connected by a curved plane as shown by the broken line 64 in FIG. 2. Consequently, even if a force is exerted on the dispersing prism unit 28, breakage hardly occurs to the border between the dispersing prism parts 35. In the dispersing prism unit 28, the prism parts 35A to 35C and the fixed part 36 are integrated. Accordingly, by only fixing the fixed part 36 that is one part, it is possible to fix a plurality of dispersing prism parts 35A to 35C at predetermined positions, thus the space for fixing may be small. As a result, the molecular fluorine laser device 11 is reduced in size, and the resonator length of the laser light 21 is reduced, thus reducing diffraction loss to increase output power of the laser light 21.

Further, since the positional relationship between the dispersing prism parts 35A to 35C is fixed, it is not necessary to perform positioning of the dispersing prism parts 35A to 35C with respect to each other, and on positioning, only the entire dispersing prism unit 28 has to be moved. Accordingly, positioning with respect to the optical axis of the laser light 21 is facilitated. When an organic substance such as an adhesive is used for fixing the dispersing prism parts 35 to each other, it is decomposed by the laser light 21 in the vacuum ultraviolet range to generate impurities, and contaminates the surfaces of the optical components such as the dispersing prism unit 28. In the present invention, the dispersing prism parts 35 are integrated with the fixed part 36, and it is not necessary to use an adhesive or the like to fix the dispersing prism parts 35 to each other, thus decreasing occurrence of impurities and occurrence of contamination of the optical components.

Figure 4:
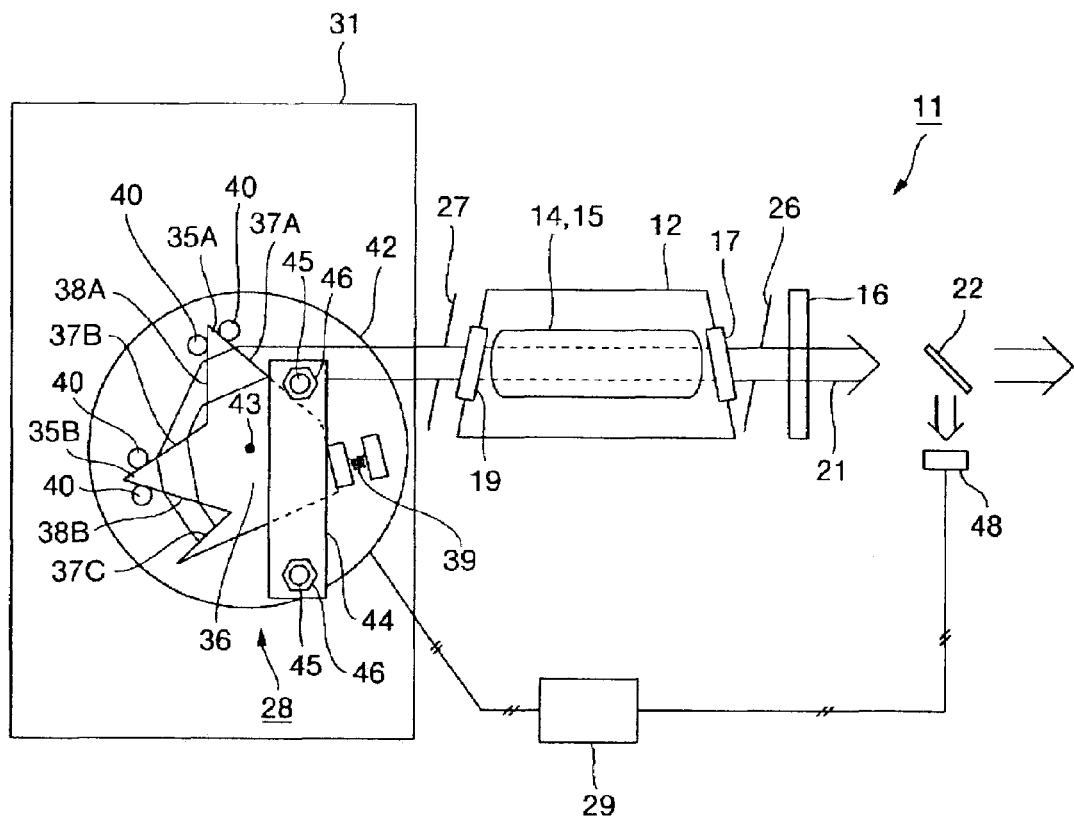
FIG. 4 is an explanatory view showing a second embodiment of the molecular fluorine laser device according to the first embodiment.

FIG. 4 shows a second embodiment, which is another embodiment of the molecular fluorine laser device 11 according to the first embodiment. In FIG. 4, the dispersing prism unit 28 includes the first and the second dispersing prism parts 35A and 35B, and the fixed part 36. Total reflection coating, which totally reflects the laser light 21, is applied to the third incidence plane 37C. Consequently, the laser light 21 is reflected at the third incidence plane 37C, and returns to the laser chamber 12. As a result of doing as above, the resonator length between the front mirror 16 and the total reflection coating is reduced, and therefore output power of the laser light 21 is increased.

Figure 5:
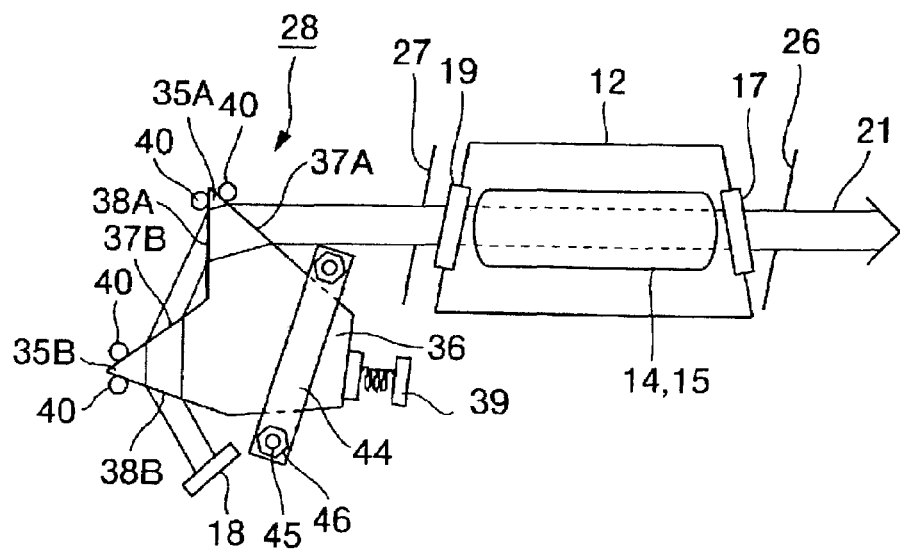
FIG. 5 is an explanatory view showing a third embodiment of the molecular fluorine laser device according to the first embodiment.

FIG. 5 shows a third embodiment of the molecular fluorine laser device according to the first embodiment. For explanation, the box 31 and the rotary stage 42 are omitted. In FIG. 5, the dispersing prism unit 28 includes the first and the second dispersing prism parts 35A and 35B, and the fixed part 36. A rear mirror 18 which totally reflects the laser light 21 is fixed behind the dispersing prism unit 28. After being transmitted through the dispersing prism parts 35A and 35B, the laser light 21 is totally reflected at the rear mirror 18, and returns to the laser chamber 12 on the same route. By additionally including the rear mirror 18 in this manner, similarly favorable laser oscillation is performed.

Figure 6:
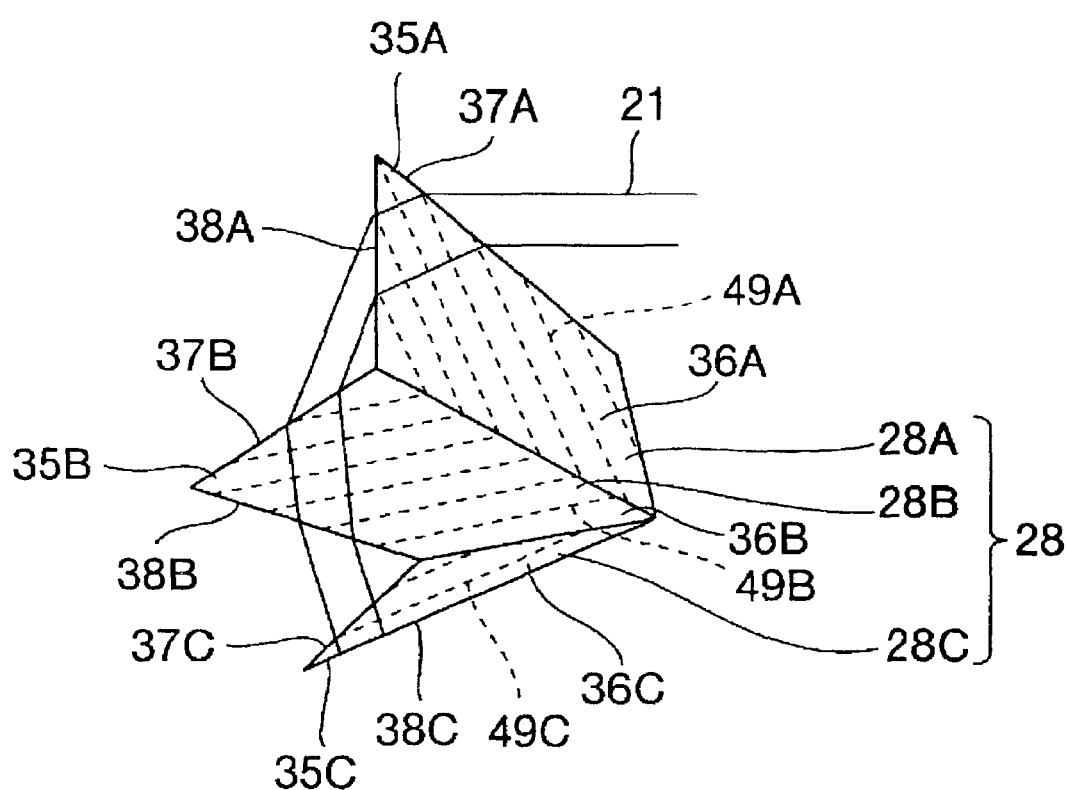
FIG. 6 is a block diagram of a dispersing prism unit according to the second embodiment of the present invention.

Next, the second embodiment will be explained. FIG. 6 shows a block diagram of the dispersing prism unit 28 according to the second embodiment. As shown in FIG. 6, the dispersing prism unit 28 according to this embodiment is constituted by combining three dispersing prisms 28A to 28C in which the dispersing prism parts 35A to 35C are integrated with the corresponding fixed parts 36A to 36C.

In FIG. 6, the broken lines 49A to 49C show cleavage surfaces of a calcium fluoride crystal constituting the dispersing prisms 28A to 28C. The dispersing prism unit 28 is constituted so that the laser light 21 is transmitted substantially perpendicularly to the cleavage surfaces 49A to 49C. Especially in this situation, it is suitable to constitute the dispersing prism unit 28 so that intense line light of which oscillation is desired out of the laser light 21 is as accurately perpendicular as possible to the cleavage surfaces 49A to 49C as accurately as possible.

Consequently, when the laser light 21 passes through the dispersing prism parts 35A to 35C, it is transmitted perpendicularly to the cleavage surfaces 49A to 49C of the crystal, and therefore birefringence hardly occurs. Accordingly, the optical path of the laser light 21 is not branched by polarization, and the beam profile is not disturbed, or the laser light 21 with an unintended wavelength is not oscillated.

Further, as in the first embodiment, when the dispersing prism unit 28 is fixed, by pressing it at the fixed parts 36A to 36C, the pressure of the fixed plate not shown is not exerted on the dispersing prism parts 35A to 35C, and the laser light 21 is not influenced by the distortion of the dispersing prism parts 35A to 35C. Since three of the dispersing prisms 28A to 28C are pressed together at one spot, only a small space for fixing is needed, and the resonator length is reduced to increase the output power of the laser light 21. In FIG. 6, the fixed parts 36A to 36C are directly in contact with each other, but they may be in contact with each other via some positioning jig.

Further, it is more preferable to join the dispersing prisms 28A to 28C shown in FIG. 6 to each other by optical contact to integrate them. The optical contact is what makes strong joint at a molecular level possible by bringing precisely polished crystal surfaces into contact with each other. It may be suitable to apply water to the crystal surfaces and join them to each other, but since the laser light 21 is in the vacuum ultraviolet range, it sometimes happens that the applied water occurs as an impurity. Accordingly, optical contact in which the dispersing prisms 28A to 28C are placed in a vacuum atmosphere and the precisely polished crystal surfaces are heated and joined to each other is more preferable.

Consequently, birefringence does not occur to the laser light 21 as what is shown in FIG. 5. In addition to this, since a plurality of dispersing prisms 28A to 28C are joined to each other by optical contact, the mutual positional relationship is not displaced as the one shown in FIG. 1. Handling is facilitated when the dispersing prism unit 28 is fixed on the rotary stage (not shown).

Figure 7:
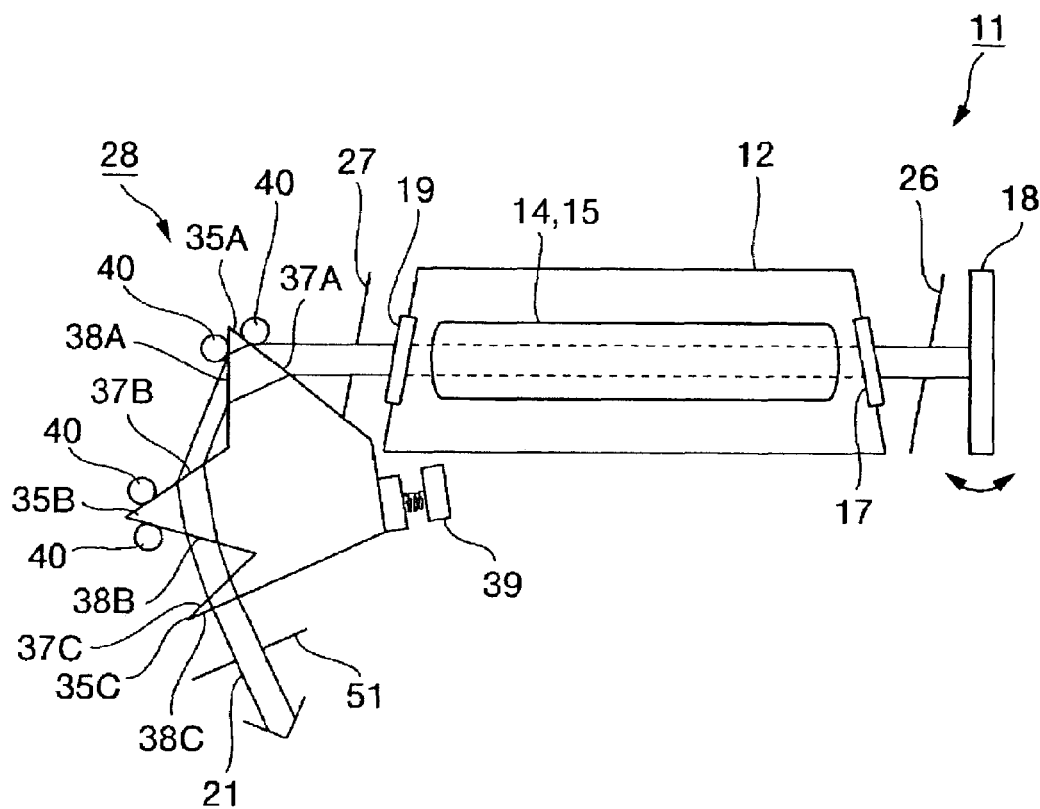
FIG. 7 is a block diagram of a molecular fluorine laser device using a dispersing prism unit according to the third embodiment of the present invention.

Next, the third embodiment will be explained. FIG. 7 shows a block diagram of the molecular fluorine laser device 11 using the dispersing prism unit 28 according to the third embodiment. In FIG. 7, the molecular fluorine laser device 11 includes the rear mirror 18, which totally reflects the laser light 21, behind the laser chamber 12 (right side of FIG. 7), and the dispersing prism unit 28 in front of the laser chamber 12. The dispersing prism unit 28 includes the first to the third dispersing prism parts 35A to 35C, and coating is not applied to the third exit plane 38C. The dispersing prism unit 28 may be integrated as shown in FIG. 1, or it may be the combination of the dispersing prisms 28A to 28C including the dispersing prism part 35 and the fixed part 36 as shown in FIG. 6, or it may be the joining of them.

The laser light 21, which is generated by pulse discharge inside the laser chamber 12, is reflected at the rear mirror 18 behind it, passes through the laser chamber 12, and is incident on the dispersing prism unit 28 in front of it. The laser light 21 is transmitted through the first to the third dispersing prism parts 35A to 35C, and is perpendicularly incident on the exit plane 38C of the third dispersing prism part 35C. Part of it returns to the laser chamber 12 on the same route by Fresnel refection on the third exit plane 38C. The residual part of the laser light 21 is transmitted through the third exit plane 38C and emitted.

When the laser light 21 in this situation passes through the inside of the first to the third dispersing prism parts 35A to 35C, only weak line light has its optical path deviated as in the first and the second embodiments. As a result, the weak line light is shielded by the slit 51 placed in front of the slits 26 and 27, and the dispersing prism unit 28, and the laser light 21 is band-narrowed. Positioning of the optical axis of the laser light 21 and the dispersing prism unit 28 is performed by moving the rear mirror 18.

As explained above, according to the third embodiment, coating is not applied to the dispersing prism unit 28, and thereby the third incidence plane 37C forms a front mirror, which partially transmits the laser light 21. As a result, all the components of the laser light 21 generated inside the laser chamber 12 passes through the dispersing prism parts 35A to 35C of the dispersing prism unit 28 before they are emitted.

Namely, in the first and the second embodiments, only a part of the laser light 21 is transmitted through the front mirror 16 directly from the laser chamber 12 and emitted, and therefore the components which are not band-narrowed sometimes mix into the emitted laser light 21. On the other hand, in the third embodiment, all the laser light 21 passes through the dispersing prism unit 28, where it is band-narrowed, and therefore impure components do not mix into the emission light, and the spectrum purity becomes high. In this situation, coating which partially reflects the laser light 21 may be applied to the third exit plane 38C.

Figure 8:
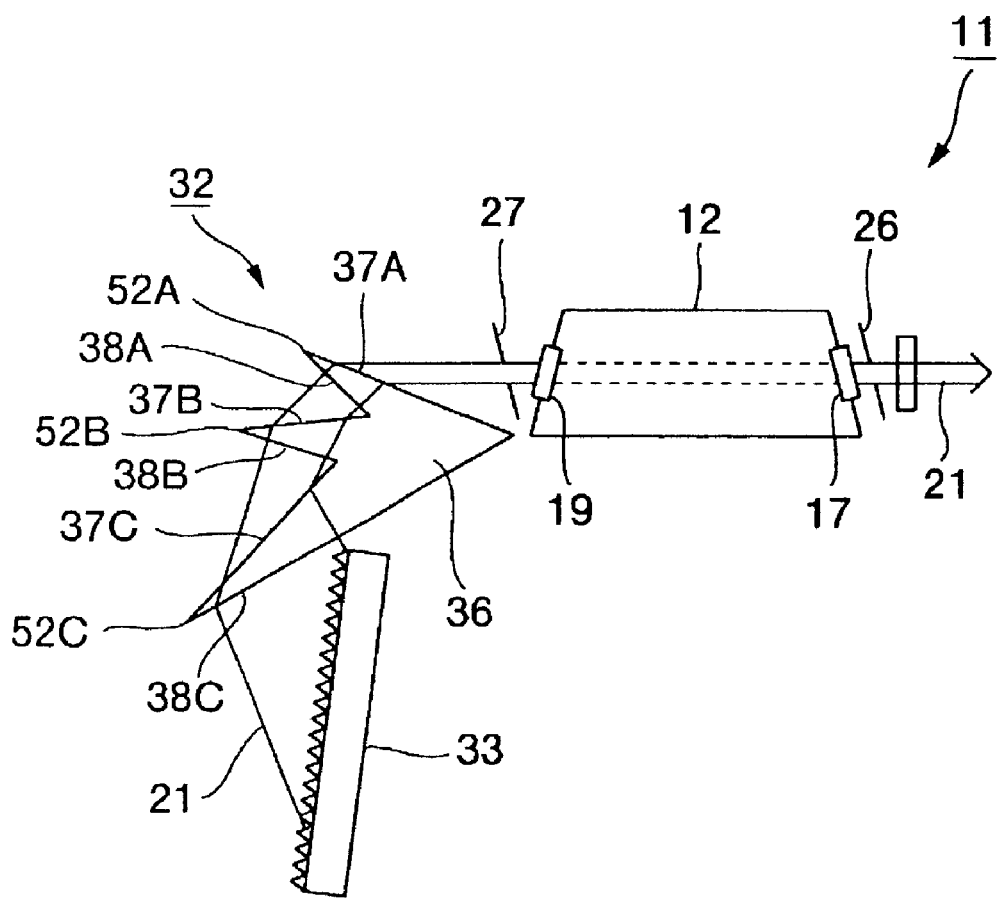
FIG. 8 is a block diagram of a molecular fluorine laser device according to a fourth embodiment of the present invention.

Next, a fourth embodiment will be explained. FIG. 8 shows a block diagram of the molecular fluorine laser device 11 according to the fourth embodiment. In FIG. 8, the molecular fluorine laser device 11 includes an expander prism unit 32 for expanding beam width of the laser light 21, and a grating 33 behind it. As shown in FIG. 8, the expander prism unit 32 includes a first to a third expander prism parts 51A to 52C and the fixed part 36. The laser light 21 is incident on the incidence planes 37A to 37C of the expander prism parts 52A to 52C diagonally from the side of the laser chamber 12, and it is perpendicularly emitted from the exit planes 38A to 38C, whereby the beam width can be expanded. The laser light 21 with the beam width being expanded is incident on the grating 33 and diffracted, and band-narrowed to the laser light 21 with narrow spectral line width with a predetermined center wavelength as a center.

As described above, in the expander prism unit 32, the space needed for fixing is also reduced. Accordingly, the resonator length between the grating 33 and the front mirror 16 is reduced, and the output power of the laser light 21 is increased. It should be understood that the above-described embodiments are each explained with the molecular fluorine laser device taken as an example, but they are also applicable to the other excimer laser devices such as ArF excimer laser devices.

Figure 9:
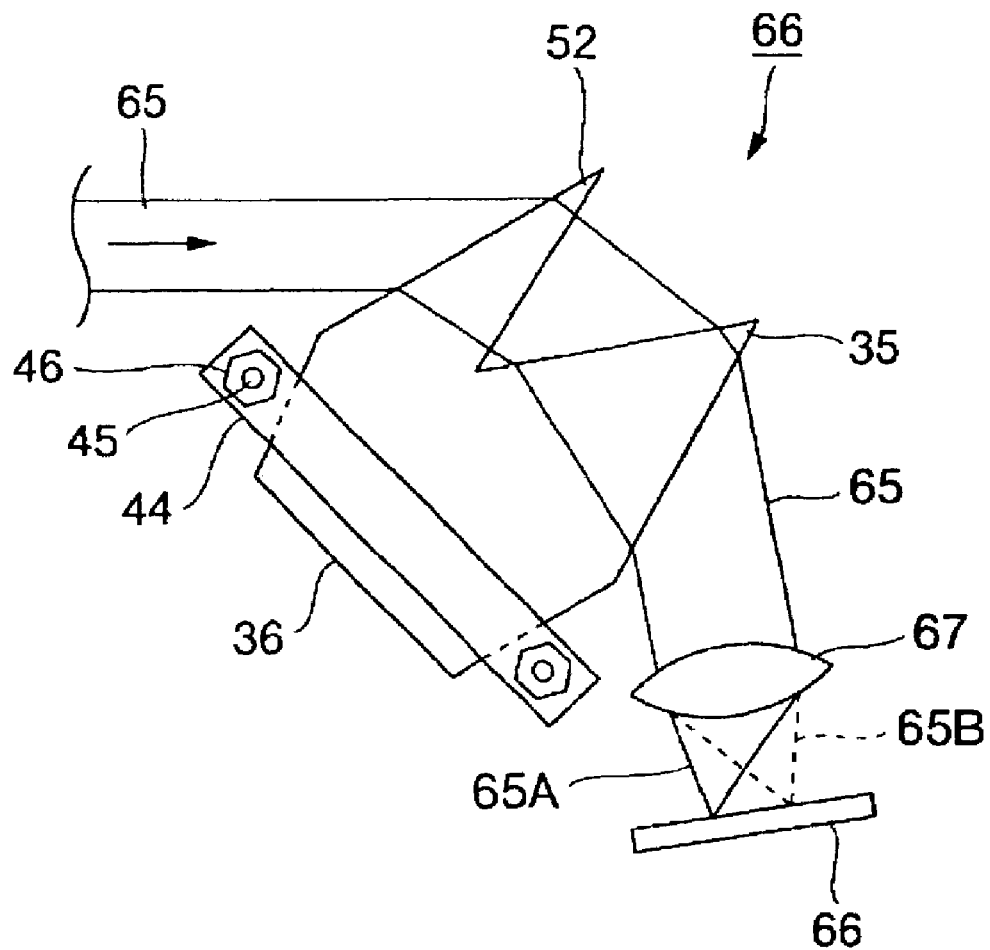
FIG. 9 is a block diagram of a spectrometer using a prism unit according to the fifth embodiment of the present invention.
Figure 10:
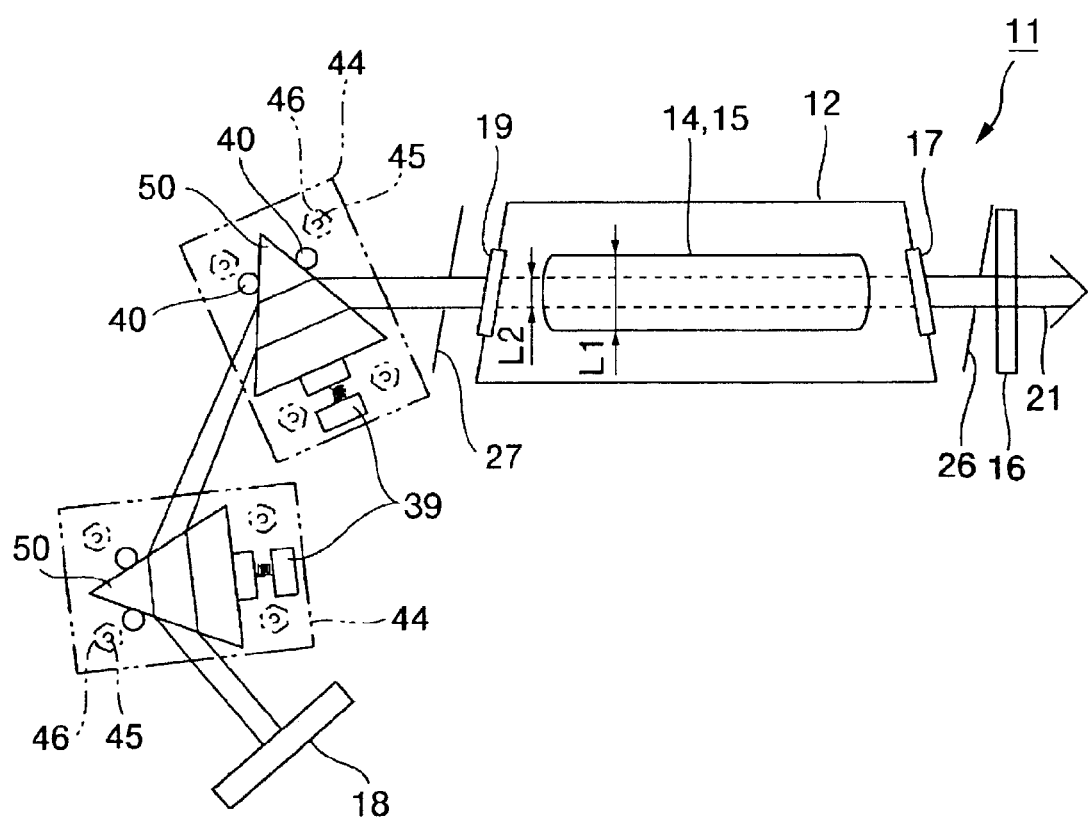
FIG. 10 is a block diagram of an excimer laser device according to a prior art.

Next, a fifth embodiment will be explained. FIG. 9 shows an example of a spectrometer using a prism unit according to the fifth embodiment. In FIG. 9, the prism unit includes an expander prism part 52 which expands width of light 65 to be measured that is an object to be measured, and a dispersing prism part 35 which refracts the light 65 to be measured at a refraction angle corresponding to a wavelength of the light 65 to be measured. The expander prism part 52 and the dispersing prism part 35 are integrated with the fixed part 36.

The light 65 to be measured has beam width expanded by the expander prism part 52, and is refracted at an angle corresponding to the wavelength at the dispersing prism part 35. The light 65 to be measured is condensed on a line sensor 66 provided behind the dispersing prism part 28 by a lens 67. In this situation, the light 65 to be measured is condensed at different positions corresponding to wavelengths as shown by measured light 65A shown by the solid line and measured light 65B shown by the broken line.

Consequently, by measuring the light condensed positions by the line sensor 66, it becomes possible to measure a refraction angle of the light 65 to be measured and detect the wavelength of the light 65 to be measured. Namely, the beam width of the light 65 to be measured is expanded by the expander prism part 52 according to the present invention, whereby resolution of spectrum can be enhanced with a compact constitution. The prism unit of the present invention can be applied not only to the laser device 11 but also to such an optical device as uses a plurality of prism parts 35 and 52.

In each of the above-described embodiments, it is mentioned that the prism parts 35 and 52 and the fixed part 36 are integrally formed, but this is not restrictive, and they may be joined by optical contact or the like. The case, in which only one fixed part 36 is formed for a plurality of prism parts 35 as in the first embodiment, and the case, in which the fixed parts 36 are formed for the individual prism parts 35 as in the second embodiment, are explained, but they are not restrictive. For example, two of the prism parts 35, and one of the fixed part 36 are integrally formed, and a thing including one of the prism part 35 and one of the fixed part 36 may be joined to or brought into contact with the integrally formed two prism parts 35 and one fixed part 36.

A plurality of prism parts 35 for refracting the incident light 21, and the fixed part 36 which is fixed to at least two of the prism parts 35 out of a plurality of prism parts 35, and the incident light 21 passing through the prism part 35 may be the light 21 with the wavelength which is desired to be selected, in the prism unit 28 which is formed so that the incident light 21 passes substantially perpendicularly to the cleavage surface 49 of the prism part 35 when the incident light 21 passes through the prism part 35.

Further, in the prism unit 28 including a plurality of prism parts 35 which refract the incident light 21, and a plurality of fixed parts 36 which are fixed to or formed integrally with a plurality of prism parts 35, a plurality of prism parts 35 may be positioned at predetermined positions by bringing the fixed parts 36 into contact with each other directly or via jigs. In the prism unit 28 with the above constitution, the fixed parts 36 may be fixed to each other by optical contact. Further, in the prism unit 28 with the above constitutions, the prism part 35 may be formed so that the incident light 21 passes substantially perpendicularly to the cleavage surface 49 of the prism part 35 when the incident light 21 passes through the prism part 35. In addition, in the above prism unit 28, the incident light 21 passing through the prism part 35 may be the light 21 with the wavelength that is desired to be selected.

Further, any one of the above-described prism units 28 is included, and by the prism unit 28, band-narrowing to narrow the spectral line width of the oscillation wavelength of the laser light 21 may be carried out.

What is claimed is:
1. A laser device, comprising:
   a laser resonator including at least;
      a reflection surface functioning as a front mirror;
      another reflection surface functioning as a rear mirror; and
      a laser medium,
   a prism unit disposed within the laser resonator, and including:
      a plurality of prism parts which refract incident light emitted from the laser medium;
      a fixed part which does not transmit the incident light and is formed integrally with at least two of said plurality of prism parts,
      wherein said plurality of prism parts forms a path along which the incident light travels, and an air gap is provided between respective sides of the prism parts at which the incident light is received and from which the incident light exits, and wherein said prism unit is integrally formed of a single crystal material.

2. The laser device according to claim 1, wherein at least one of said plurality of prism parts comprises a dispersing prism part which refracts the incident light at an angle corresponding to a wavelength of the incident light, and only a wavelength in a desired range out of a plurality of oscillation wavelengths is selectively oscillated by said prism unit.

3. The laser device according to claim 1, further comprising:

a rotary stage that is rotatable and on which said prism unit is mounted; and a rotation controller that controls rotation of the rotary stage to adjust an optical axis of the laser light.

4. The laser device according to claim 3, further comprising:

a tilting mechanism that tilts the prism unit to further adjust an optical axis of the laser light.

* * * * *